United States Patent
Park et al.

(10) Patent No.: US 10,193,647 B2
(45) Date of Patent: Jan. 29, 2019

(54) GENERATING INTERFERENCE PATTERN FOR CONTROLLING INTER-CELL INTERFERENCE AND METHOD FOR SIGNALING THEREFOR

(71) Applicant: LG ELECTRONICS INC., Seoul (KR)

(72) Inventors: Kungmin Park, Seoul (KR); Heejeong Cho, Seoul (KR); Hyunsoo Ko, Seoul (KR); Hyeyoung Choi, Seoul (KR); Ilmu Byun, Seoul (KR)

(73) Assignee: LG ELECTRONICS INC., Seoul (KR)

(*) Notice: Subject to any disclaimer, the term of this patent is extended or adjusted under 35 U.S.C. 154(b) by 35 days.

(21) Appl. No.: 15/519,517

(22) PCT Filed: Oct. 27, 2014

(86) PCT No.: PCT/KR2014/010125
§ 371 (c)(1),
(2) Date: Apr. 14, 2017

(87) PCT Pub. No.: WO2016/068349
PCT Pub. Date: May 6, 2016

(65) Prior Publication Data
US 2017/0244506 A1    Aug. 24, 2017

(51) Int. Cl.
| | |
|---|---|
| H04L 5/00 | (2006.01) |
| H04J 11/00 | (2006.01) |
| H04B 7/06 | (2006.01) |
| H04L 27/26 | (2006.01) |

(52) U.S. Cl.
CPC .......... *H04J 11/005* (2013.01); *H04B 7/0667* (2013.01); *H04L 5/0007* (2013.01); *H04L 5/0023* (2013.01); *H04L 5/0033* (2013.01); *H04L 5/0051* (2013.01); *H04L 5/0073* (2013.01); *H04L 27/2613* (2013.01)

(58) Field of Classification Search
CPC ........................... H04L 5/0007; H04L 5/0051
See application file for complete search history.

(56) References Cited

FOREIGN PATENT DOCUMENTS

| WO | 2014119861 | 8/2014 |
|---|---|---|
| WO | 2014123387 | 8/2014 |

OTHER PUBLICATIONS

Intel Corporation, "On D2D discovery physical structure design," 3GPP TSG-RAN WG1 #76, R1-140131, Feb. 2014, 12 pages.
(Continued)

*Primary Examiner* — Ronald B Abelson
(74) *Attorney, Agent, or Firm* — Lee Hong Degerman Kang Waimey

(57) ABSTRACT

The present invention relates to generating an interference pattern for controlling inter-cell interference, a method for signaling therefor, and an apparatus utilizing the method. The method for signaling an interference pattern according to the present invention may comprise the steps of: determining the length and cyclic shift offset for a first interference pattern to be allocated to a set reference resource from among interference pattern sets; generating a cell-specific sequence to which the cyclic shift offset of the first interference pattern has been applied; and allocating the first interference pattern and cell-specific sequence to a resource and transmitting same.

6 Claims, 15 Drawing Sheets

(56) References Cited

OTHER PUBLICATIONS

LG Electronics, "Discussion on Remaining Details of Resource Pool Configuration," 3GPP TSG-RAN WG1 #78bis, R1-144021, Oct. 2014, 7 pages.

LG Electronics, "Remaining issues for D2D control and data transmission," 3GPP TSG-RAN WG1 #78bis, R1-144027, Oct. 2014, 7 pages.

PCT International Application No. PCT/KR2014/010125, Written Opinion of the International Searching Authority dated Jul. 22, 2015, 4 pages.

FIG. 6

First cell

| $S_0$ | | $S_1$ | | $S_2$ | | $S_3$ | |

| | $S_0^*$ | | $S_1^*$ | | $S_2^*$ | | $S_3^*$ |

Second cell, Period 3, offset 1 Cyclic shift

| $Z_0$ | | $Z_1$ | | $Z_2$ | | $Z_3$ | |

| | $Z_1^*$ | | $Z_2^*$ | | $Z_0^*$ | | $Z_4^*$ |

Second cell, Period 3, offset 2 Cyclic shift

| $Y_0$ | | $Y_1$ | | $Y_2$ | | $Y_3$ | |

| | $Y_2^*$ | | $Y_0^*$ | | $Y_1^*$ | | $Y_5^*$ |

GENERATING INTERFERENCE PATTERN FOR CONTROLLING INTER-CELL INTERFERENCE AND METHOD FOR SIGNALING THEREFOR

CROSS-REFERENCE TO RELATED APPLICATIONS

This application is the National Stage filing under 35 U.S.C. 371 of International Application No. PCT/KR2014/010125, filed on Oct. 27, 2014, the contents of which are all hereby incorporated by reference herein in its entirety.

BACKGROUND OF THE INVENTION

Field of the Invention

The present invention relates to wireless communications, and more particularly, to a method for generating an interference pattern for controlling inter-cell interference, a signaling method for the same and an apparatus using the same.

Related Art

According to the transmission technique based on the orthogonal frequency division multiplexing access (OFDMA), one or more subcarriers may be independently allocated to each terminal. Accordingly, following a request of a terminal, a frequency resource may be efficiently allocated without the frequency interference within a cell.

In a cellular network system, depending on the position of a terminal in a cell, the performance of the system may be significantly changed. Particularly, the inter-cell interference may significantly degrade the performance of the terminal located on a cell boundary. In addition, as the efficiency of the frequency reuse, high data transmission rate may be obtained in the center of a cell, but the inter-cell interference gets worse. Accordingly, on the cell boundary, a terminal may undergoes great interference from a neighboring cell, and accordingly, the degradation of the signal to interference plus noise ratio (SINR) of the terminal may become more serious.

In the cellular network system based on the OFDMA, in order to mitigate the inter-cell interference, a research have been performed of a technique for avoiding the inter-cell interference, that of a technique of averaging the influence of the inter-cell interference, that of a technique for removing the inter-cell interference, and the like.

Currently, in a cellular network system, many moving cells are existed. The inter-cell interference may occur between a moving cell and a fixed cell. Accordingly, a method for mitigating the inter-cell interference between a moving cell and a fixed cell is required.

SUMMARY OF THE INVENTION

According to an embodiment of the present invention, a method and apparatus for mitigating inter-cell interference is provided.

An embodiment of the present invention is to provide a method for generating an interference pattern for controlling inter-cell interference and an apparatus using the same.

In addition, an embodiment of the present invention is to provide a method for signaling the generated interference pattern and an apparatus using the same.

A method for signaling an interference pattern for controlling inter-cell interference may include determining a pattern length of a first interference pattern and a cyclic shift offset that are going to be allocated to a predetermined reference resource among interference pattern sets; generating a cell-specific sequence in which the cyclic shift offset of the first interference pattern; and transmitting and allocating the first interference pattern and the cell-specific sequence to a resource.

An interference pattern of which the first interference pattern and the cell-specific sequence are different may be allocated to a same resource in a neighboring cell.

A second interference pattern may be induced from the first interference pattern.

The interference pattern set may include a plurality of interference patterns according to a predetermined order, and the interference pattern set may be repeated in a time domain of a resource.

The cell-specific sequence may be generated based on a modification frequency of the interference pattern and a transmission frequency of the cell-specific sequence.

The cell-specific sequence may be generated based on a length of the interference pattern and a number of frequency resources used for transmitting the cell-specific sequence.

Advantageous Effects

According to the present invention, a method and apparatus for mitigating inter-cell interference is provided.

According to the present invention, it is provided the pattern randomization technique for increasing an inter-cell interference randomization effect and a method for designing a pilot signal for signaling the pattern.

Through it, a method for generating a pilot signal that represents an interference randomization pattern while maintaining a cell-specific pilot sequence property.

BRIEF DESCRIPTION OF THE DRAWINGS

FIG. 6 is a diagram illustrating a symbol pattern according to another embodiment of the present invention.

DESCRIPTION OF EXEMPLARY EMBODIMENTS

Figure 1:
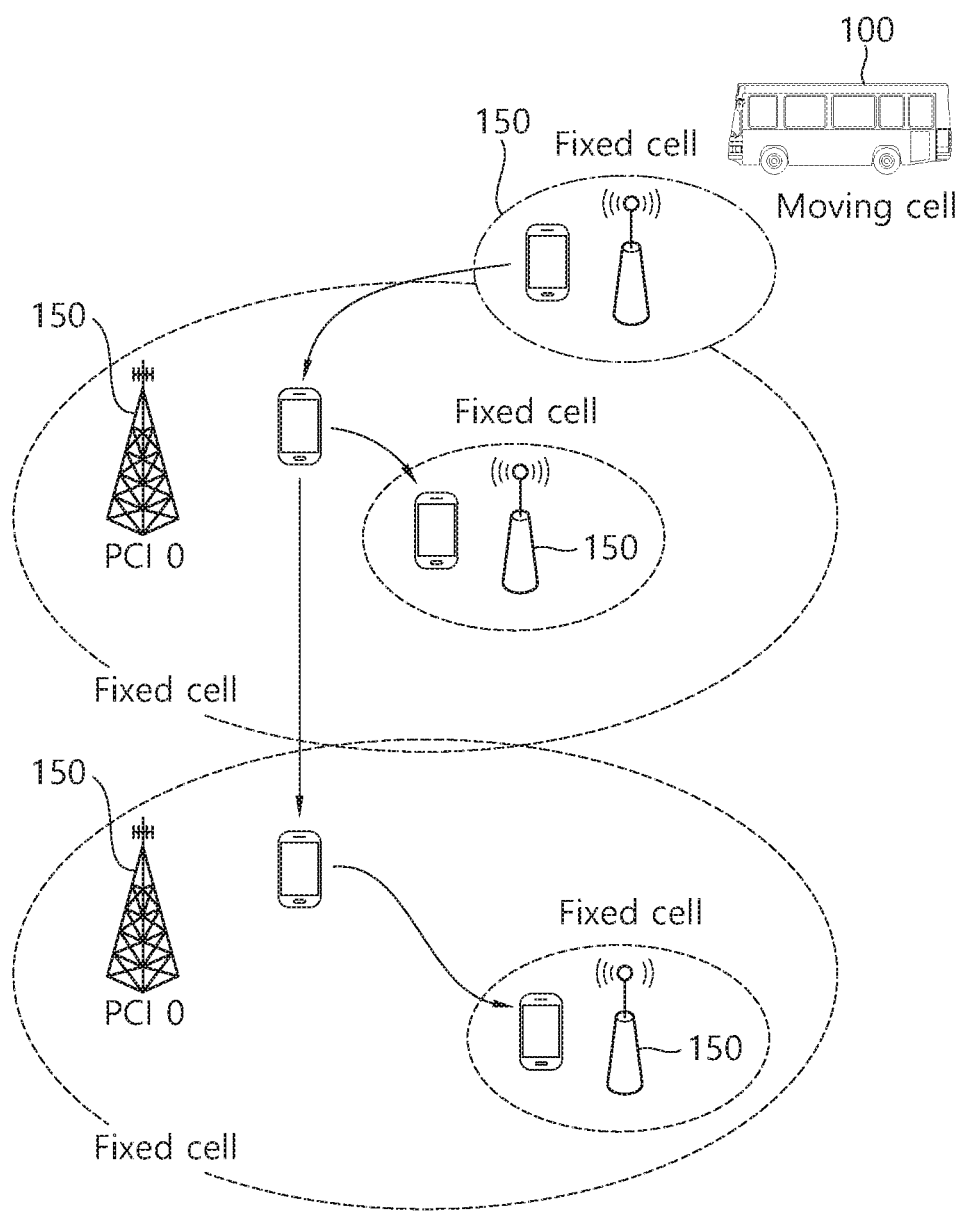
FIG. 1 is a conceptual diagram illustrating a movement in a moving cell.

A wireless device may be stationary or mobile, and may be called as other terms such as a user equipment (UE), a user terminal (UT), a subscriber station (SS), mobile terminal (MT), and so on. In addition, the wireless device may be a mobile device equipped with a communication function such as a mobile phone, a PDA, a Smart phone, a wireless modem, a notebook PC, and so on, or a non-mobile device such as a PC, a vehicle mounted device. A base station generally refers to a fixed station that communicates with a wireless device and may be called as other terms such as an evolved-NodeB (eNB), a base transceiver system (BTS), an access point, and the like.

Hereinafter, it will be described that the present invention is applied based on 3rd Generation Partnership Project (3GPP) long term evolution (LTE) or 3GPP LTE-Advanced (LTE-A). However, this is just an example, and the present invention may be applied to various wireless communication systems. Hereinafter, the term LTE includes LTE and/or LTE-A.

The present disclosure describes a communication network as a target. And, the tasks in the communication network may be performed during a procedure of controlling a network and transmitting data in the system (e.g., a base station) that manages the corresponding communication network, or may be performed in a wireless device linked to the corresponding network.

Recently, a commercialization of the Long Term Evolution (LTE) system, which is a next generation wireless communication system, has been earnestly supported. After the necessity is perceived for supporting a massive service for needs of users with high-quality as well as a voice service while guaranteeing an activity of users of a wireless device, such an LTE system has been more rapidly extended. The LTE system provides low transmission latency, high transmission rate, high system capacity and coverage improvement.

Owing to the advent of the high-quality service, the needs for wireless communication services has been rapidly increased. In order to actively cope with it, more than anything else, the capacity of communication system should be increased. As a way to increase the communication capacity in a wireless communication environment, it may be considered a method for newly finding an available frequency band and a method for increasing the efficiency for a limited resource.

Among these, as the method for increasing the efficiency for a limited resource, a technique of increasing a transmission capacity by taking a diversity gain by additionally securing a spatial area for utilizing resource by mounting multiple antennas on a transceiver or by transmitting data in parallel through each antenna, so called, a multiple antenna transmission and reception technique has been vigorously developed with great attention.

In the multiple antenna system (multiple-input multiple-output system), as a method for increasing Signal to Noise Ratio (SNR), beamforming and precoding may be used, and in the closed-loop system that may use feedback information in a transmitter, the beamforming and the precoding are used for maximizing the SNR through the corresponding feedback information.

Meanwhile, in the case that channel information share is not smooth between neighboring cells such as a moving cell that is unable to establish an interface with a neighboring cell in time due to high speed or a femto cell in which information share with another cell is restricted, the inter-cell interference avoiding technique through the Coordinated Multipoint (CoMP) technique between closed-loop base stations may not be applied.

FIG. 1 is a conceptual diagram illustrating a movement in a moving cell.

Hereinafter, in an embodiment of the present invention, a moving cell may indicate a mobile base station, and a fixed cell may indicate a base station that does not moves in a fixed position. A moving cell may be expressed as other term, a moving base station, and a fixed cell may be expressed as other term, a fixed base station.

For example, a moving cell 100 may be a base station installed in a mobile object such as a bus. Based on the buses in Seoul, about 2000 moving cells 100 may be existed. Accordingly, in the current cellular network system, there is high possibility that the interference occurs between the moving cell 100 and a fixed cell 150.

In the case of the inter-cell interference (ICI) between the fixed cells 150, in order to mitigate the inter-cell interference, the resource division may be performed considering the distance between a base station and a wireless device. Or, the interference may be mitigated by performing a dynamic resource division by sharing the channel information between cells or by performing a cooperative communication.

However, in the case of the moving cell 100, there is a difficulty in using the interference control method between the fixed cells 150 as it is.

Figure 2:
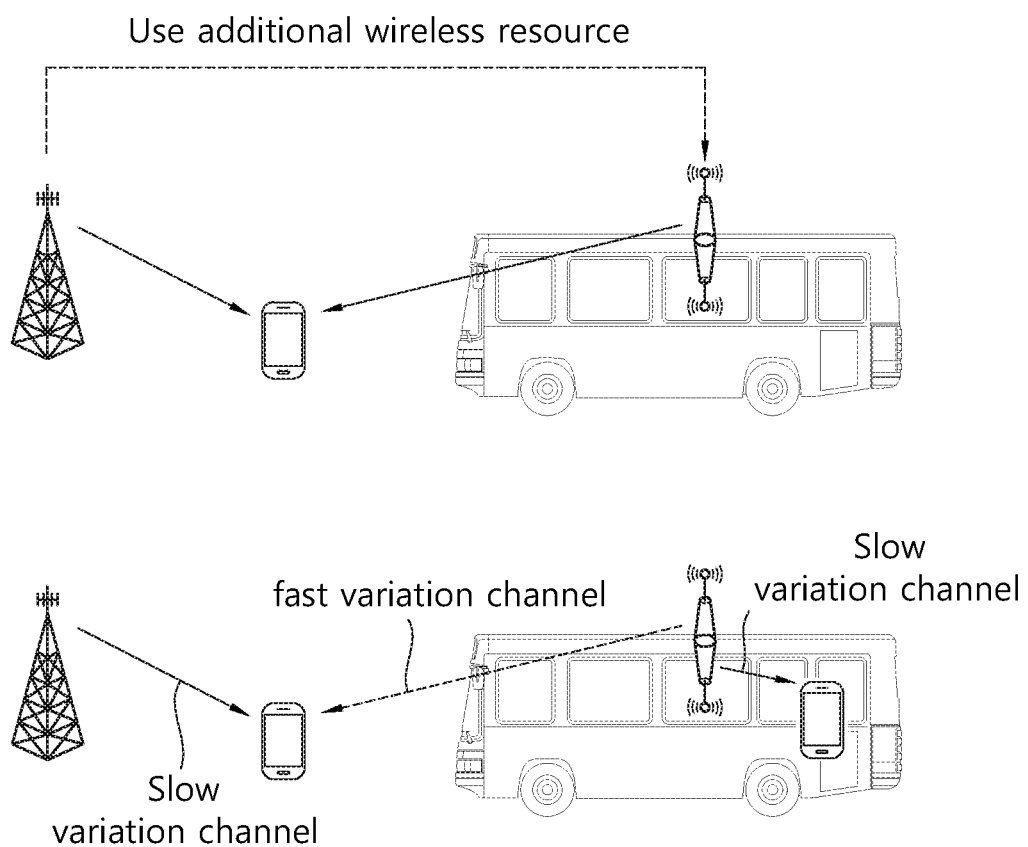
FIG. 2 is a conceptual diagram illustrating the problem that may occur in the case that the interference between a moving cell and a fixed cell is controlled by the existing inter-cell interference control technique.

FIG. 2 is a conceptual diagram illustrating the problem that may occur in the case that the interference between a moving cell and a fixed cell is controlled by the existing inter-cell interference control technique.

There are many cases that a service is provided through a real-time traffic in the moving cell. Accordingly, the inter-ference control based on the semi-static resource division may be improper in the moving cell.

Referring to the upper part of FIG. 2, a moving cell may be connected with another cell based on the wireless backhaul. Accordingly, it may be difficult to perform the dynamic resource division by sharing channel information or use the inter-cell interference mitigation method based on the cooperative communication. Particularly, in the case of the joint transmission (JT)/dynamic point selection (DPS), the data that is going to be transmitted to a wireless device should be shared through a wired backhaul between base stations. However, the data sharing between the moving cell through the wired backhaul and the fixed cell requires an additional use of the wireless resource, but also makes it difficult to share the data stably depending on a wireless channel situation. Accordingly, the interference mitigation between a fixed cell and a moving cell based on the cooperative communication may be difficult.

Referring to the lower part of FIG. 2, the channel between a moving cell and a fixed cell may be rapidly changed owing to the movement of the moving cell. Accordingly, a development of a technique is required for interference control and decrease in the situation in which sharing of the inter-cell signal and the interference channel information are not smooth.

In such an environment, a technique of whitening interference through interference randomization or inter-cell interference averaging may be used instead of avoiding interference.

The inter-cell interference randomizing is a method of randomizing the interference from a neighboring cell and approximating it using the additive white Gaussian noise (AWGN). The inter-cell interference randomizing may decrease the influence of the process of decoding channel by the signal of other user based on, for example, the cell-specific scrambling, the cell-specific interleaving, and so on.

The an inter-cell interference averaging is a method of averaging the inter-cell interference in the level of channel coding block through averaging all of the interferences due to a neighboring cell or symbol hopping.

The interference randomization technique according to an embodiment of the present invention is to adjust a ratio of a desired signal for each resource and an interference signal differently by simultaneously receiving the desired signal and the interference signal in a part of resource and receiving only the desired signal in another part of resource when transmitting desired signal through time/frequency/space resource. As such, the SINR becomes different for each resource, and accordingly, the channel coding gain may be obtained.

In addition, the interference randomization technique according the present invention may propose a method for increasing variation of the interference signal received with the desired signal, not changing the resource use.

Such an interference randomization technique is a technique applicable between transmitters performing a spatial diversity transmission, and is a method for performing interference randomization by differently configuring a repetition transmission pattern of a symbol which is repeatedly transmitted for obtaining spatial diversity gain.

An improved interference randomization technique according the present invention corresponds to a method for varying an interference signal that influences on de-precoding of each symbol, changing signal to interference rate (SIR) of a signal in a Quasi-static channel interval, and securing interference diversity in the Quasi-static channel interval in order to obtain the diversity gain.

Generally, the signal diversity means averaging the receiving power of a signal by repeatedly transmitting and receiving the identical information through various channels. According to the signal diversity, the signal to interference plus noise rate (SINR) is variably decreased, and owing to it, the possibility of recovering the information in a padding channel may be increased.

The interference diversity according to the present invention is the similar concept as the signal diversity. According to the interference diversity, by receiving a plurality of interferences through various channels, the receiving power of the interference becomes equalized and the SINR variation due to the interference may be decreased. Through this, an effect of increasing the diversity gain of the signal is generated in the situation that the receiving power of the interference signal is great.

Figure 3:
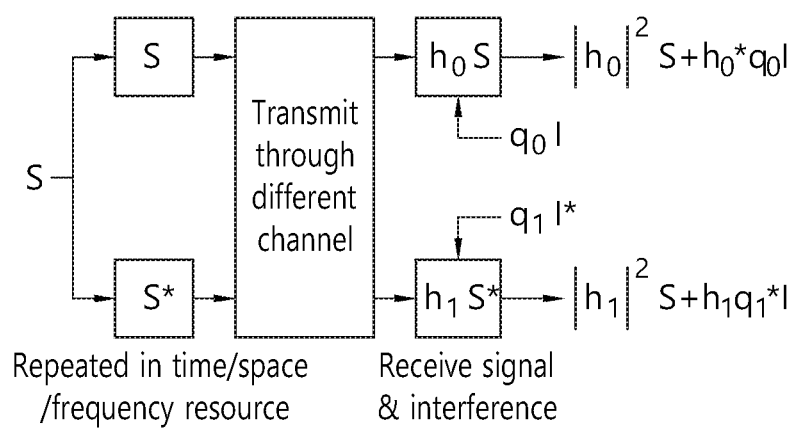
FIG. 3 is a diagram illustrating a situation that a signal is repeatedly transmitted through different channels.

FIG. 3 is a diagram illustrating a situation that a signal is repeatedly transmitted through different channels.

As shown in the drawing, a transmitting end may transmit a single transmission symbol (S, hereinafter, a first symbol) and a modified symbol (S*, hereinafter, a second symbol) to a receiving end such as a wireless device through different channels with each other, for example, different antennas. In this case, the second symbol represents that the complex conjugate operation is performed with respect to the first symbol.

Herein, $h_0$ represents a channel for the symbol between an antenna transmitting the first symbol and a receiving end, and $h_1$ represents a channel for the symbol between an antenna transmitting the second symbol and a receiving end.

In this case, I represents an interference signal, I* represents an interference signal which is operated by the complex conjugate. $q_0$ represents a channel for the interference signal between an antenna transmitting the first symbol and a receiving end, and $q_1$ represents a channel for the interference signal between an antenna transmitting the second symbol and a receiving end.

The first symbol and the second symbol may be repeatedly transmitted by being allocated to time, space or frequency resource, and a transmitting end may receive the signal and the interference.

As shown in the drawing, when the first symbol is transmitted, the receiving end may receive $|h_0|^2 S + h_0^* q_0 I$ together with the interference signal, and the receiving end may receive $|h_1|^2 S + h_1 q_1^* I$ with respect to the second symbol.

Finally, the symbol and the interference signal received by the receiving end may be represented as Equation 1.

$$\frac{|h_0|^2 + |h_1|^2}{2} S + \frac{(h_0^* q_0 + h_1 q_1^*) I}{2} \qquad \text{[Equation 1]}$$

In the case that the channel state is the semi-static state in which the channel is hardly changed, the interference diversity effect is decreased.

Figure 4:
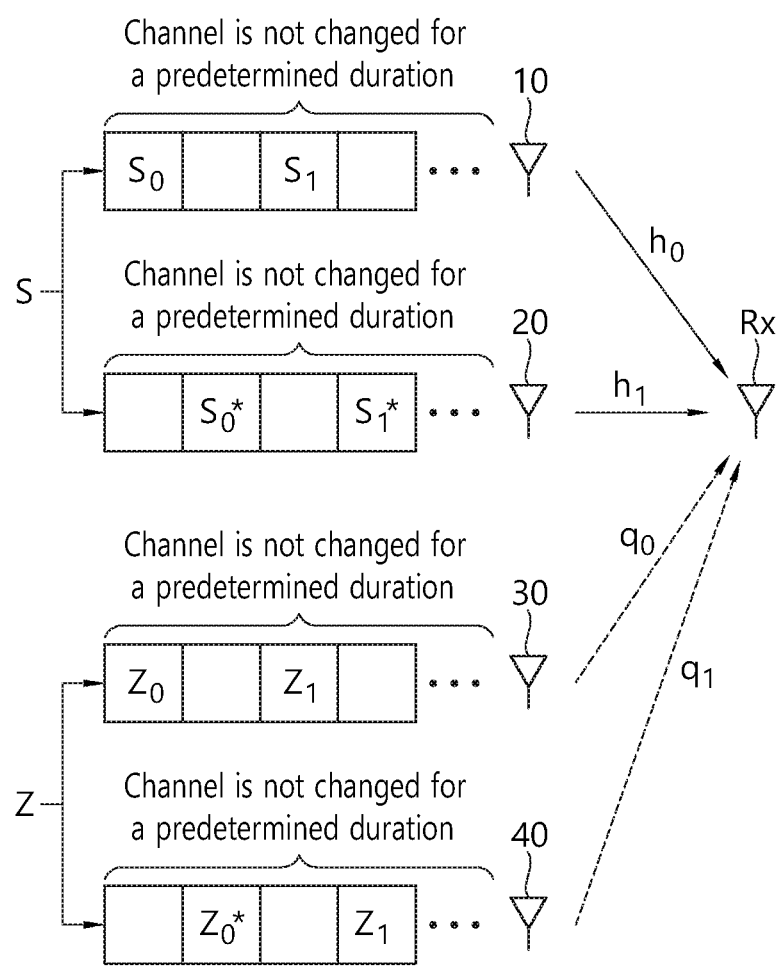
FIG. 4 is a diagram illustrating a symbol and an interference signal received through a semi-static channel.

FIG. 4 is a diagram illustrating a symbol and an interference signal received through a semi-static channel.

As illustrated, a wireless device Rx, which is a receiver, may receive a symbol S transmitted through two antennas, and may receive the signal transmitted through two antennas as an interference signal Z.

A first antenna 10 and a second antenna 20 may be the antennas of a cell (hereinafter, it is referred to as a first cell) which provides a service for the wireless device Rx, and a third antenna 30 and a fourth antenna 40 may be the antennas of a cell (hereinafter, a second cell) which transmits a symbol Z, which may act as an interference signal on the wireless device Rx.

For example, in the case that a fixed cell acts as an interference source with respect to the wireless device serviced by a moving cell, the first cell may be the moving cell and the second cell may be the fixed cell. On the contrary, in the case that a moving cell is an interference source with respect to the wireless device serviced by a fixed cell, the first cell may be the fixed call and the second cell may be the moving cell.

In FIG. 4, the row for the symbol may mean the resource on which the symbol such as time, space or frequency is transmitted.

In the semi-static state in which a channel is not changed for a predetermined duration, symbols $S_0$, $S_1$ . . . are transmitted through the first antenna 10, and the symbols $S_0^*$, $S_1^*$ . . . modified by the symbols transmitted through the first antenna 10 are transmitted through the second antenna 20.

Symbols $Z_0$, $Z_1$ . . . are transmitted through the third antenna 30, and the symbols $Z_0^*$, $Z_1^*$ . . . modified by the symbols transmitted through the third antenna 30 are transmitted through the fourth antenna 40.

In the aspect of the wireless device, the transmission symbol S transmitted in the first cell may be a reception signal and the transmission symbol Z transmitted in the second cell may be an interference signal.

Accordingly, in FIG. 4, $h_0$ represents the channel between the first antenna 10 of the first cell and the wireless device Rx serviced by the first cell, $q_0$ represents the channel between the third antenna 30 of the second cell and the wireless device Rx, and $q_1$ represents the channel between the fourth antenna 40 of the second cell and the wireless device Rx.

Finally, the reception symbol $(\hat{S}_0, \hat{S}_1)$ that is received by the wireless device may be represented as Equation 2.

$$\hat{S}_0 = S_0 + \frac{(h_0^* q_0 + h_1 q_1^*) Z_0}{|h_0|^2 + |h_1|^2}$$

$$\hat{S}_1 = S_1 + \frac{(h_0^* q_0 + h_1 q_1^*) Z_1}{|h_0|^2 + |h_1|^2}$$

[Equation 2]

As represented in Equation 2, since the coefficient $$\frac{(h_0^* q_0 + h_1 q_1^*)}{|h_0|^2 + |h_1|^2}$$

of the interference signal that acts on the reception symbol is the same in two symbols, and the SIR for each symbol is the same.

This may represent that the gain for the diversity of the entire packet is limited or decreased. In the case that the interference is great in the semi-static state, the situation in which a wireless device undergoes strong interference may be continued.

Hereinafter, a method for securing the interference diversity by changing a repetition pattern of an interference symbol, not the interference of the same size, will be described.

Figure 5:
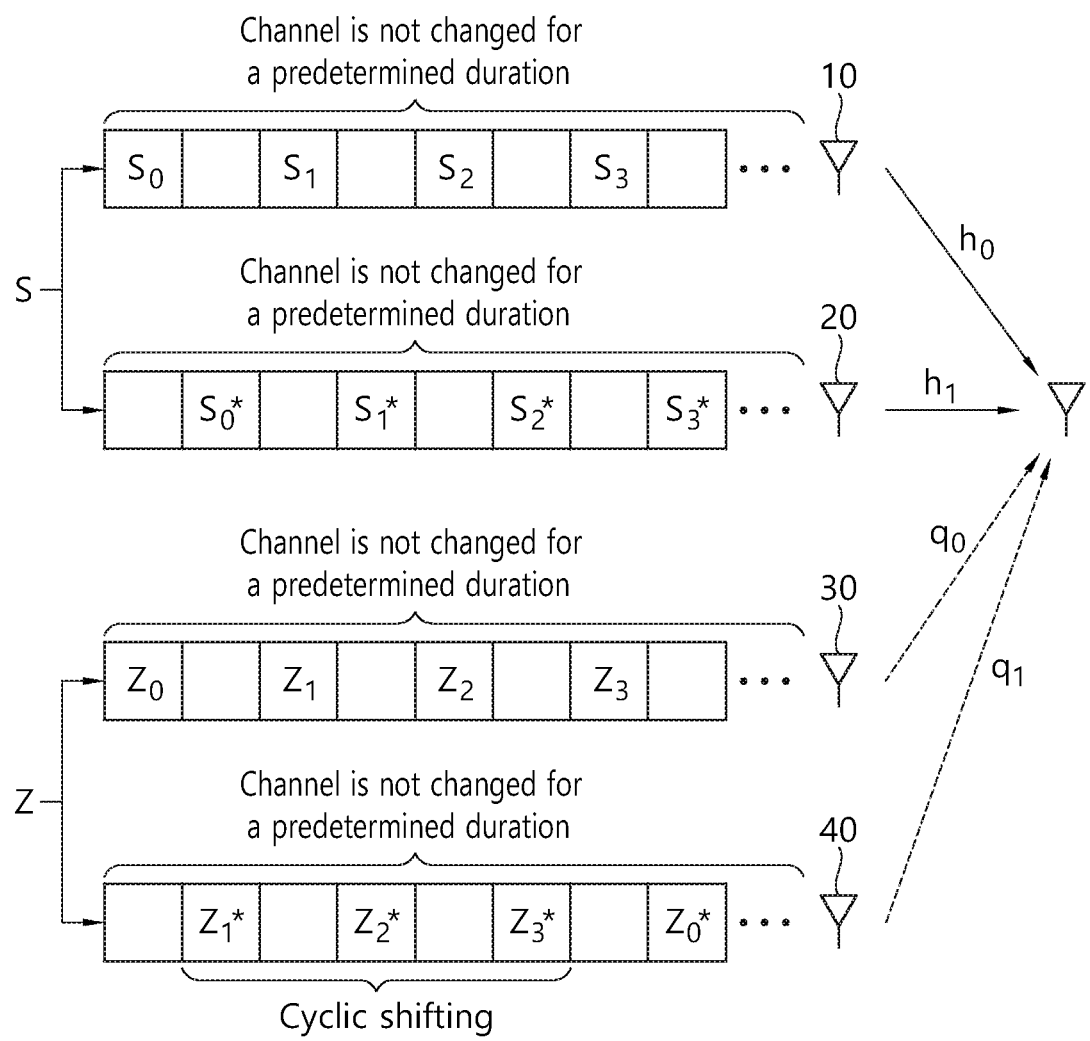
FIG. 5 is a diagram illustrating a repetition pattern of a reception symbol according to an embodiment of the present invention.

FIG. 5 is a diagram illustrating a reception symbol and an interference signal according to an embodiment of the present invention.

As illustrated, in the semi-static state in which a channel is not changed for a predetermined duration, symbols $S_0$, $S_1$, $S_2$, $S_3$ . . . are transmitted through the first antenna 10, and the symbols $S_0^*$, $S_1^*$, $S_2^*$, $S_3^*$ . . . modified by the symbols transmitted through the first antenna 10 are transmitted through the second antenna 20.

Symbols $Z_0$, $Z_1$, $Z_2$, $Z_3$ . . . are transmitted through the third antenna 30, and the symbols $Z_1^*$, $Z_2^*$, $Z_3^*$, $Z_0^*$ . . . modified by the symbols transmitted through the third antenna 30 are transmitted through the fourth antenna 40.

According to an embodiment of the present invention, the symbols transmitted by the fourth antenna are transmitted in the order of $Z_1^*$, $Z_2^*$, $Z_3^*$, $Z_0^*$ by the pattern being cyclic shifted from the existing $Z_0^*$, $Z_1^*$, $Z_2^*$, $Z_3^*$. That is, the repetition pattern of the symbol that may be an interference signal for the wireless device may be changed according to a regular order.

The first cell and the second cell, which is transmitters, use different precoders with each other, and accordingly, such a change of the repetition pattern may be implemented.

As such, in the case that the pattern of the symbol being repeated is changed, the reception symbol $(\hat{S}_0, \hat{S}_1)$ received by the wireless device may be represented as Equation 3.

$$\hat{S}_0 = S_0 + \frac{h_0^* q_0 Z_0 + h_1 q_1^* Z_2}{|h_0|^2 + |h_1|^2}$$

$$\hat{S}_1 = S_1 + \frac{h_0^* q_0 Z_1 + h_1 q_1^* Z_3}{|h_0|^2 + |h_1|^2}$$

[Equation 3]

As represented in Equation 3, in the equation of acting as the interference in the reception symbol, different interference symbols are included. This represents that the interference is changed for each symbol in the semi-static duration. Through this, it is available to secure the interference diversity for a packet, and the effect of improving diversity performance is generated.

Hereinafter will be described a detailed precoding designing method for mitigating inter-cell interference.

FIG. 6 is a diagram illustrating a symbol pattern according to another embodiment of the present invention. Particularly, FIG. 6 represents precoding performed by each base station by using different repetition patterns when the symbols are repeated in a cell.

As illustrated, in the first cell, symbol S and the modified symbol S* are sequentially transmitted through different antennas for the same signal. That is, symbol S0 is transmitted through antenna 1(A0), symbol $S_0^*$ is transmitted through antenna 2(A2). In addition, sequentially, symbol $S_1$ is transmitted through antenna 1(A0) and $S_1^*$ is transmitted through antenna 2(A1).

When the symbol pattern repeated by the first cell is represented as a precoding matrix, it may be represented as Equation 4 or Equation 5.

$$\begin{bmatrix} x_n & 0 \\ 0 & x_n^* \end{bmatrix}$$

[Equation 4]

$$\begin{bmatrix} x_{3k} & 0 & x_{3k+1} & 0 & x_{3k+2} & 0 \\ 0 & x_{3k} & 0 & x_{3k+1} & 0 & x_{3k+2} \end{bmatrix}$$

[Equation 5]

As represented in Equation 4 and Equation 5, in the case that symbol $S_0$ is transmitted through one antenna, $S_0^*$ is transmitted through another antenna. In addition, sequentially, in the case that symbol $S_1$ is transmitted through the antenna through which $S_0$ is transmitted, $S_1^*$ is transmitted through another antenna.

On the contrary, in the second cell, the symbol pattern may be changed as the center of FIG. 6 or as the bottom. The second cell may repeatedly transmit the symbol pattern through two antennas with the repeated symbol number being 3 and by configuring offset on the order of symbol to be transmitted.

In the case of the symbol pattern of the center of FIG. 6, the number of symbols of which pattern is repeated is 3, that is, the repetition period is 3 and it represents that the offset of the transmission symbol order is set to 1. That is, through antenna 1(A0), symbols $Z_0$, $Z_1$, $Z_2$, $Z_3$ . . . are sequentially transmitted and the modified symbols thereof may be transmitted through antenna 2(A1) as the sequence of $Z_1^*$, $Z_2^*$, $Z_0^*$, $Z_4^*$ . . . not the existing sequence of $Z_0$, $Z_1$, $Z_2$, $Z_3$ . . . .

It may be represented as Equation 6 in the case of being expressed in precoding matrix.

$$\begin{bmatrix} x_{3k} & 0 & x_{3k+1} & 0 & x_{3k+2} & 0 \\ 0 & x_{3k} & 0 & x_{3k+2} & 0 & x_{3k} \end{bmatrix} \quad \text{[Equation 6]}$$

In addition, in the case of the symbol pattern of the bottom of FIG. 6, the number of symbols of which pattern is repeated is 3, that is, the repetition period is 3 and it represents that the offset of the transmission symbol order is set to 2. That is, through antenna 1(A0), symbols $Y_0, Y_1, Y_2, Y_3 \ldots$ are sequentially transmitted and the modified symbols thereof may be transmitted through antenna 2(A1) as the sequence of $Y_2^*, Y_0^*, Y_1^*, Y_5^* \ldots$ not the existing sequence of $Y_0, Y_1, Y_2, Y_3 \ldots$.

It may be represented as Equation 7 in the case of being expressed in precoding matrix.

$$\begin{bmatrix} x_{3k} & 0 & x_{3k+1} & 0 & x_{3k+2} & 0 \\ 0 & x_{3k+2} & 0 & x_{3k} & 0 & x_{3k+1} \end{bmatrix} \quad \text{[Equation 7]}$$

The same or different offset may be applied for each cell, and the same or different period may be applied for each cell.

In addition, according to the period of the cyclic shift, the cell that uses the same transmission antenna port may use the precoder of different sizes.

For example, in Equation 6 or Equation 7, the cyclic shift period in which symbols are repeated is 3, but it may be 4 or more. Further, when a period is set, the offset value may be set as the maximum "period-1" value.

Between the cells that may be an interference source with each other, when the precoding for a signal is performed, the pattern of the repeated symbol may be variously changed by pre-configuring the precoder such as Equations 4 to 7. Through this, the interference diversity may be secured, thereby the reception capability of a signal being improved, and the situation in which the performance of the reception signal is degraded due to strong interference may be prevented.

The symbol pattern such as FIG. 6 to which Equation 4 to 7 are applied, hereinafter, may be referred to as the repetition transmission pattern or the inter-cell interference randomization pattern (ICI Randomization pattern, IR).

Meanwhile, as the above embodiment, in the case that the inter-cell interference randomization is performed by regulating the pattern that the same symbols are repeatedly transmitted, in order to obtain the inter-cell interference randomization gain, the neighboring cells should use different repetition transmission patterns respectively.

For this, the following methods—a method that each different repetition transmission pattern is given to the neighboring fixed cell and the repetition transmission pattern that is exclusively secured for the moving cell is given to the moving cell, a method for controlling that the neighboring mode cells may always have different repetition transmission patterns through the network configuration, a method for decreasing the possibility that the neighboring cells use the same repetition transmission pattern by having each cell selectively use it after designing a great multitude repetition transmission pattern and so on—may be applied.

When the interference randomization is implemented by the above methods being applied, in the case of a network of which cell density is high or there exist a plurality of moving cells, in order to perform the inter-cell interference randomization, various repetition transmission patterns are required to be designed and allocated to each cell.

Especially, in the case of the area where a great number of cells are concentrated in a moment such as a bust stop, etc., the inter-cell interference by which moving cells are affected as well as the inter-cell interference by which fixed cells are affected, is required to be randomized and so much more repetition transmission patterns should be generated.

The repetition transmission pattern for the inter-cell randomization, that is, the IR pattern number may be decided by the IR pattern size. In order to make many numbers of IR patterns, the length of IR pattern should be lengthened. When the length of the IR pattern is increased, the distance will be increased.

That is, in the case of performing a great many inter-cell interference randomization, a great IR pattern should be designed. In this case, since a distance between resource elements to which the identical symbol is repeatedly transmitted is bigger, a problem is occurred that the signal reception performance is decreased, and additionally in the case that the IR pattern is excessively bigger, a problem is generated that the inter-cell interference randomization is not applied when transmitting the short packet.

Therefore, in an embodiment of the present invention, a method is proposed for overcoming the gain decrease that is occurred when the IR patterns are collided between the neighboring cells through the IR pattern randomization and the IR patterns are collided by a hidden cell such as an express moving cell while resources are allocated in order for the neighboring cells to use different IR patterns respectively but the IR pattern capacity, that is, the IR pattern number should be limited.

Hereinafter, the IR pattern randomization method and the method for utilizing the Demodulation pilot signal in order to signal thereof, will be described.

The base station may define the IR pattern which may be applied by time/frequency resource block and use two or more IR patterns when each packet is transmitted.

In this case, the IR pattern which is applied to each time/frequency resource block may be determined by a unique value of each cell such as a cell global ID or by communication with neighboring cells.

Each IR pattern may be based on mapping to a frequency domain and another IR pattern may be allocated to a different time resource in the respective resource block.

The neighboring cells may use the same IR patterns in the same resource block. However, in this case the benefit for the interference randomization may be obtained by varying the application order of the IR patterns that are allocated to the time resource in the same resource block.

Figure 7A:
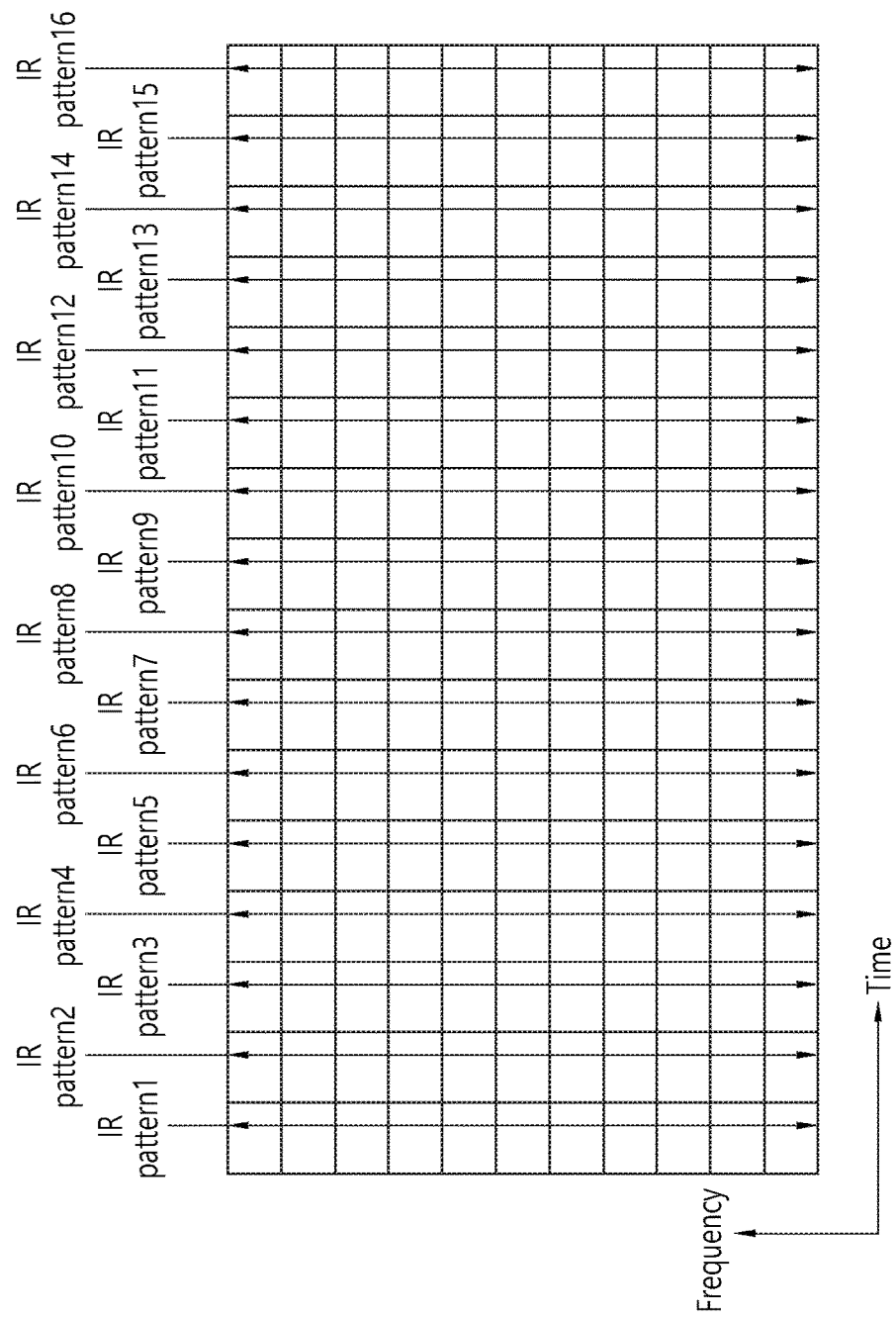
FIG. 7a is a diagram illustrating the IR pattern according to an embodiment of the present invention.
Figure 7B:
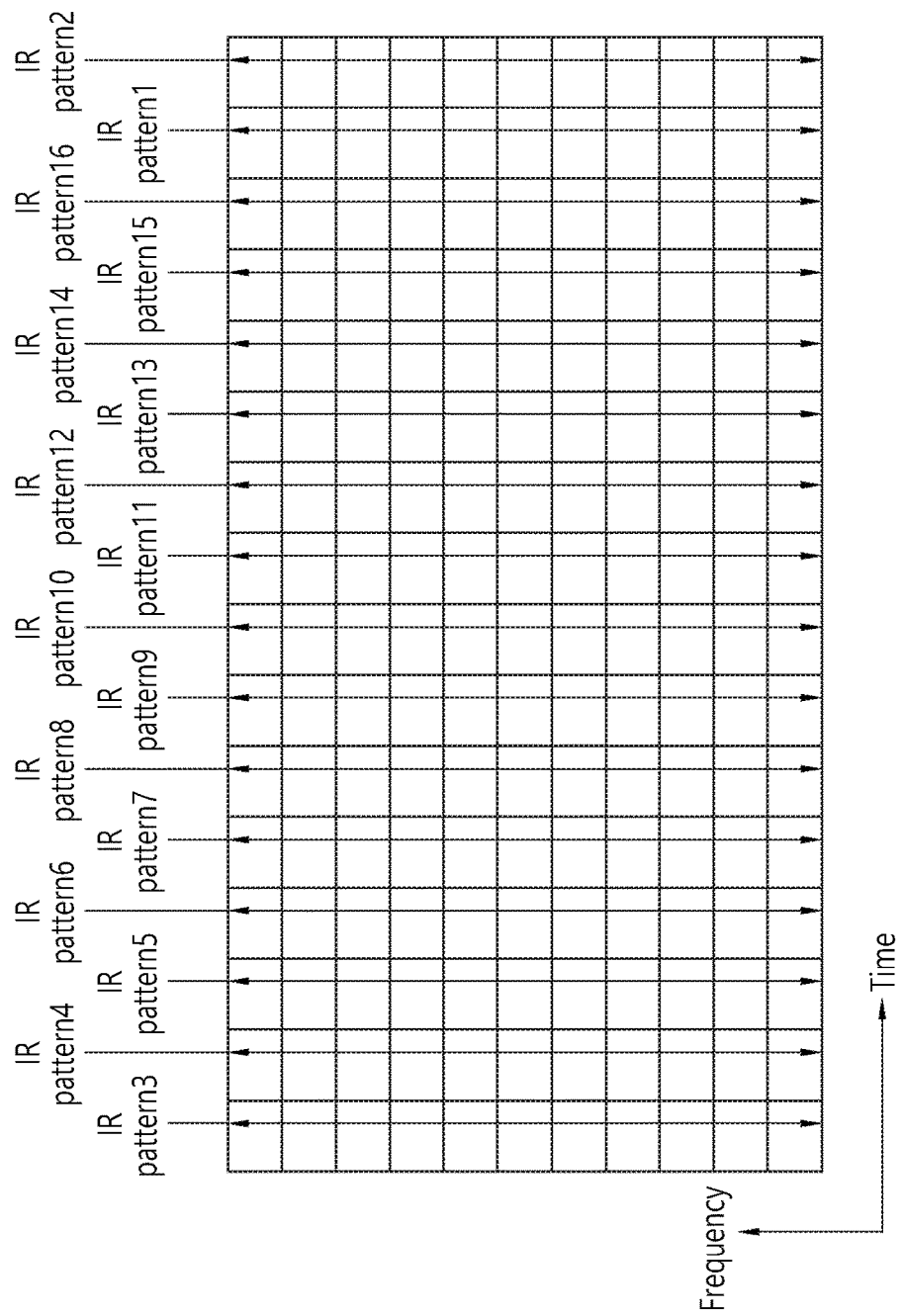
FIG. 7b is a diagram illustrating the IR pattern according to another embodiment of the present invention.

FIG. 7a and FIG. 7b are diagrams illustrating the IR pattern according to an embodiment of the present invention.

Particularly, FIG. 7a and FIG. 7b illustrate the IR patterns that are allocated to the same wireless resource of cells that are adjacent to each other.

In the resource block illustrated in FIG. 7a and FIG. 7b, the IR pattern is allocated as a frequency domain, 16 different IR patterns are allocated to different time domains.

In the first time resource in the resource block of FIG. 7a, IR pattern 1 is allocated, and IR pattern 2, IR pattern 3, . . . , IR pattern 16 are allocated in consecutive order. Meanwhile, in the first time resource in the resource block of FIG. 7b, the allocation order is not from IR pattern 1 but from IR pattern 3 to IR pattern 16 sequentially, and after that, IR pattern 1 and 2 are allocated. That is, different IR patterns are allocated to the same time resource in the resource block that is given to the neighboring cells, and the inter-cell interference randomization between the neighboring cells is implemented through it.

The IR pattern for each resource block is not randomly set in the entire time domain, the IR pattern set that is randomly selected, that is, IR pattern 1 to 16 are repeated in a regular cycle. It is for limiting the complexity when the wireless device recognizes the IR pattern The IR pattern may be determined by two parameters of the IR pattern size, i.e., the IR pattern length and the cyclic shift offset.

The IR pattern size may mean the number of the frequency resource elements of the resource block, and the cyclic shift offset means the offset that is used for the repeated transmission of the symbol, which is described with reference to FIG. 6.

The cyclic shift offset may be used as an index that is available for distinguishing the corresponding IR pattern among the IR pattern set. The cyclic shift offset may be expressed as Mod(GCID+N+Nf+Nt, P−1), the global cell ID (GCID) is a cell identifier, N represents an arbitrary constant that is defined by each cell, Nf represents a resource block frequency index in the resource block, Nt represents a resource block time index in the resource block, and P represents the IR pattern length.

Each of the neighboring cells may be configured so as to have the same IR pattern length or such that the IR pattern length of each cell becomes an integer multiple of the IR pattern length of the neighboring cells.

As such, the IR pattern randomization may be performed by allocating the two parameter values for the IR pattern size and the cyclic shift offset differently by the resource block that corresponds to each cell.

More particularly, the IR pattern parameter value, which is going to be used for the resource group or resource block that is a reference point of each cell, is required to be allocated differently by the neighboring cell and the IR pattern, which is going to be used for another resource group or resource block that is determined by a rule pre-arranged between a base station and a wireless device, is determined. By using such a method, the complexity of the IR pattern blind detection of the wireless device that is generated by the IR pattern randomization may be decreased.

First of all, a reference point, for example, the parameter value of the IR pattern that is applied to the first time resource of the resource block, which becomes a criterion, will be selected.

The parameter value may be determined by a unique value of a cell or determined by the consultation with neighboring cells.

From the IR pattern that is applied to such a reference point may be derived the IR pattern that is applied to another resource block or resource group.

The IR pattern selection method that is going to be used for another resource block or resource group may be configured through a predetermined regulation such as a standard and may be delivered to a wireless device through the system information, etc., in advance.

And then, the IR pattern that is used during the IR pattern period defined by a standard or pre-configured may be induced. According to the IR pattern period, the same IR pattern may be repeated.

Depending on the IR pattern assigned to the first time resource of the resource block or resource group, the next IR pattern that is going to be assigned to the successive time resource may be determined.

Meanwhile, in order to apply the inter-cell interference randomization to the transmission of channel or information that is transmitted without any advance control information such as the physical downlink control channel (PDCCH) and so on, the present invention proposes the IR pattern indication operating based on the blind detection. In this case, the wireless device is required to recognize the IR pattern before the detection and for this, a signaling method is proposed that the IR pattern indication information is added to the existing demodulation pilot signal.

The demodulation pilot signal that each cell transmits is transmitted to be UE-specific, however, in order to secure the pilot signal detection performance of a wireless device, the demodulation pilot signal used by each cell should be orthogonal or quasi-orthogonal. In the case that the wireless device recognizes the physical ID of a cell or receives the system information, it should receive the demodulation pilot signal based on it.

In the case that these two conditions are fulfilled, the existing demodulation pilot cell-specific sequence may be used as a means of signaling for indicating the IR pattern.

According to the present invention, as the same as before, the demodulation pilot sequence is generated through the cell-specific parameter, e.g., physical cell ID (PCI). And then, the IR pattern for each resource is applied to the above sequence and then a cell & resource specific pilot sequence is generated.

For example, in order to generate the demodulation pilot signal corresponding to the resource group or resource block in which the IR pattern of a type that the IR pattern length is 4 and the cyclic shift offset is 1 is used, the base station may apply the cyclic shift that the period is 4 and the offset is 1 to the cell-specific sequence corresponding to the pilot signal. That is, in the case that the offset 1 is applied to the repeated symbol that configures the sequence and the period 4 may be repeated.

When the IR pattern is applied to the demodulation pilot cell-specific sequence, the demodulation pilot signal pattern that is allocated to the resource block may vary according to the IR pattern modification frequency and the demodulation pilot signal transmission frequency. In addition, the demodulation pilot signal pattern that is allocated to the resource block may also vary according to the maximum length of the IR pattern and the number of frequency domain resources that are used for the demodulation pilot signal.

Figure 8:
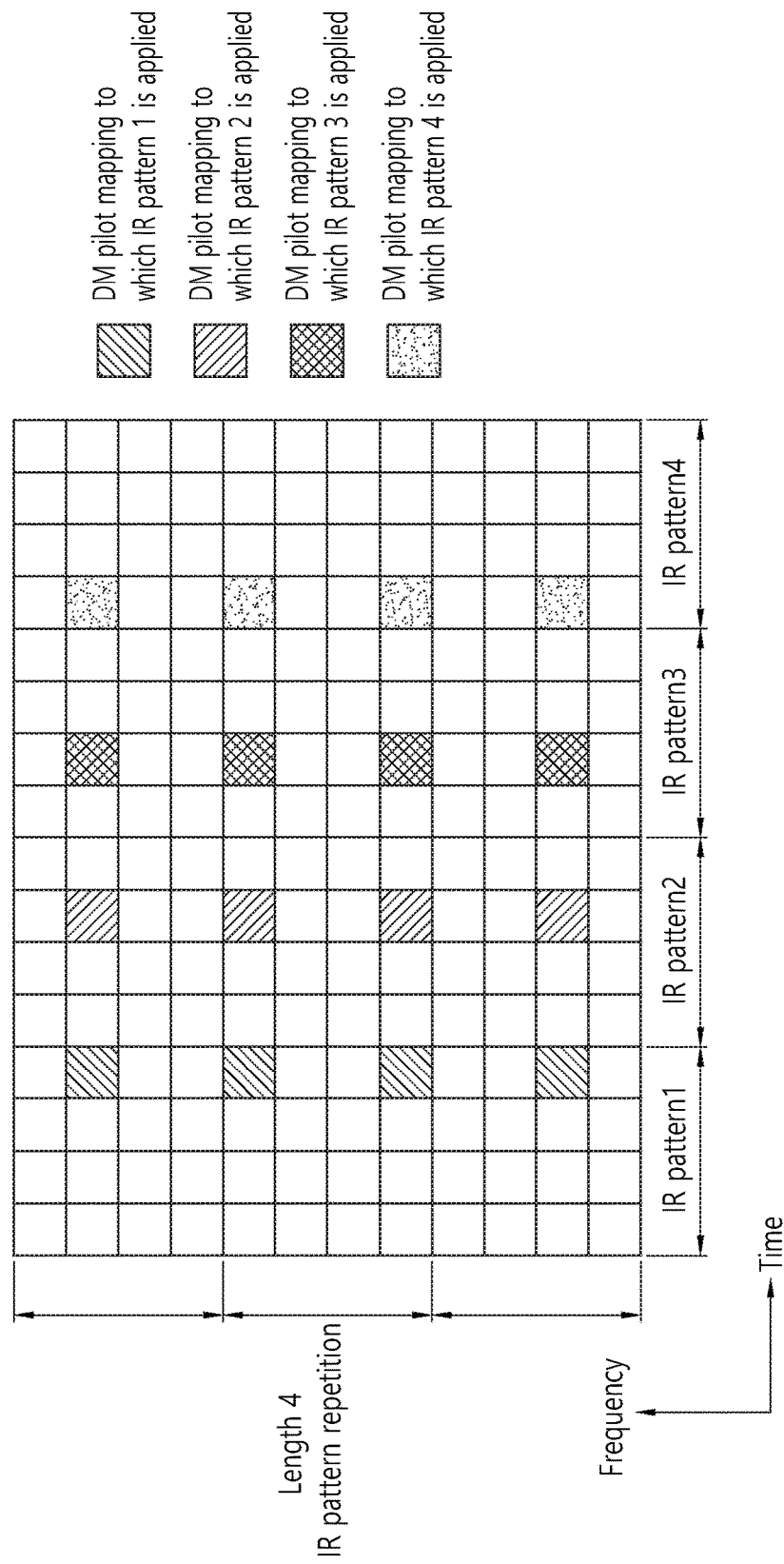
FIG. 8 is a diagram illustrating the IR pattern using the pilot signal according to an embodiment of the present invention.

FIG. 8 is a diagram illustrating the IR pattern using the pilot signal according to an embodiment of the present invention.

FIG. 8 shows an example of a case that the IR pattern modification frequency is less than or equal to the demodulation pilot signal transmission frequency, and the IR pattern length is less than or equal to the number of frequency domain resources used for the demodulation pilot signal. The resource allocation structure shown in FIG. 8 may be applied to a case that the number of demodulation pilot signal transmissions and the resources to be used should be enough to indicate the modification of the IR pattern.

As illustrated, IR patterns 1 to 4 are allocated sequentially according to the time domain and the IR pattern is repeated as a frequency domain. In FIG. 8, the IR pattern is changed by every 4 resource elements on the axis of the time domain and the demodulation pilot signal is transmitted by every 3 resource elements on the axis of the time domain. That is, the IR pattern modification frequency is less than the demodulation pilot signal transmission frequency. In addition, it shows that the IR pattern length is 4 and the number of the frequency domain resources used for the demodulation pilot signal is 4.

According to FIG. 8, the demodulation pilot signal that is applied to IR pattern 1 is transmitted through the resource element to which IR pattern 1 is allocated, and the demodulation pilot signal that is applied to IR pattern 2 is transmitted through the resource element to which IR pattern 2 is allocated. That is, the demodulation pilot signal that is applied to IR pattern n is transmitted through the resource element to which IR pattern n is allocated.

Figure 9:
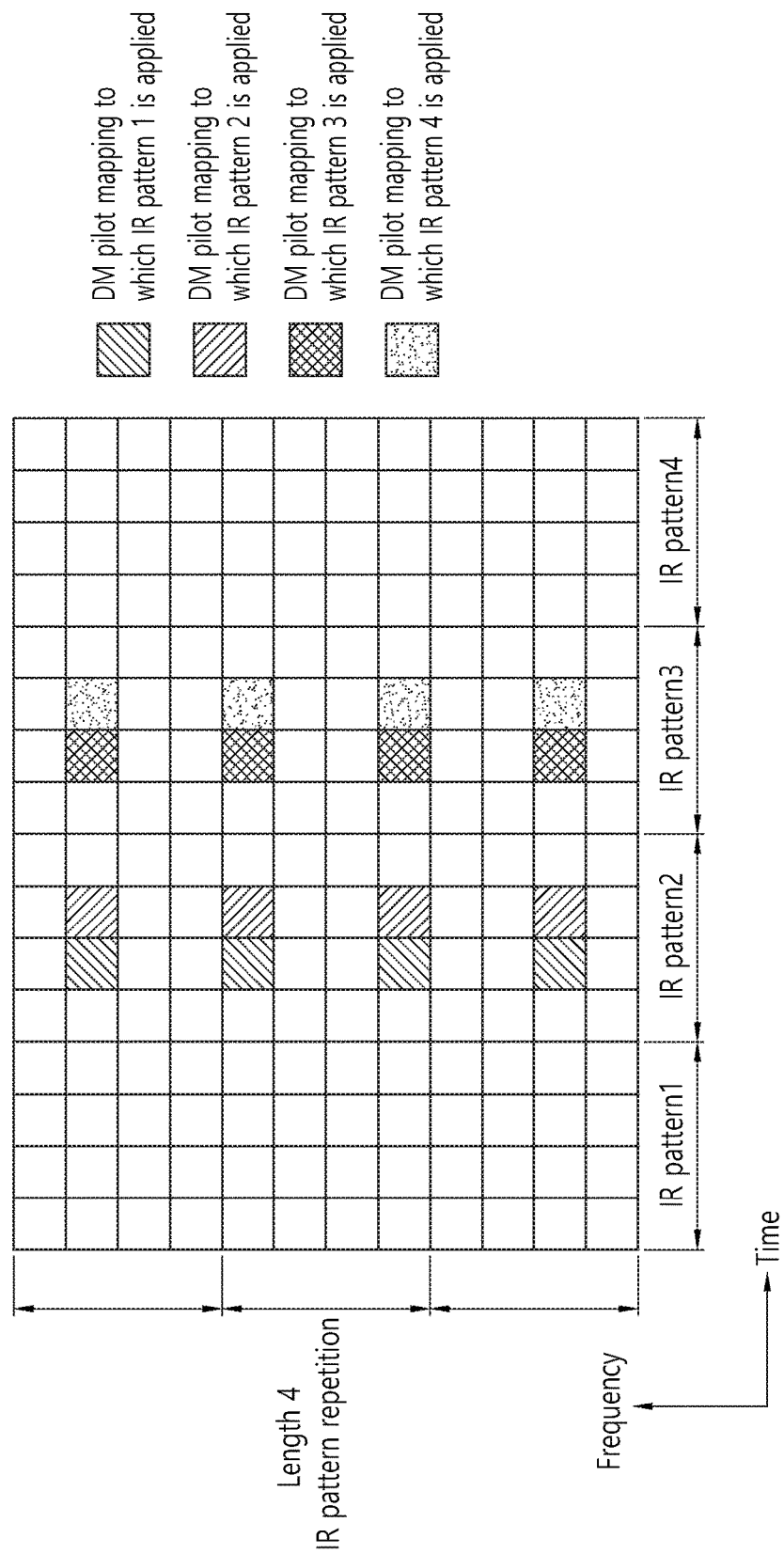
FIG. 9 is a diagram illustrating the IR pattern using the pilot signal according to an embodiment of the present invention.

FIG. 9 is a diagram illustrating the IR pattern using the pilot signal according to an embodiment of the present invention.

Similar to FIG. 8, FIG. 9 shows an example of a case that the IR pattern modification frequency is less than or equal to the demodulation pilot signal transmission frequency, and the IR pattern length is less than or equal to the number of frequency domain resources used for the demodulation pilot signal.

However, according to FIG. 9, the demodulation pilot signal that is applied to IR patterns 1 and 2 is transmitted through the resource element to which IR pattern 2 is allocated, and the demodulation pilot signal that is applied to IR patterns 3 and 4 is transmitted through the resource element to which IR pattern 3 is allocated.

According to the mapping rule of the demodulation pilot signal and the resource element, the resource group to which the IR pattern is allocated and the resource to which the demodulation pilot signal is allocated may be different. In this case, it is available to transmit by generating the demodulation pilot signal sequence that indicates the application order of the IR pattern in the resource block.

Figure 10:
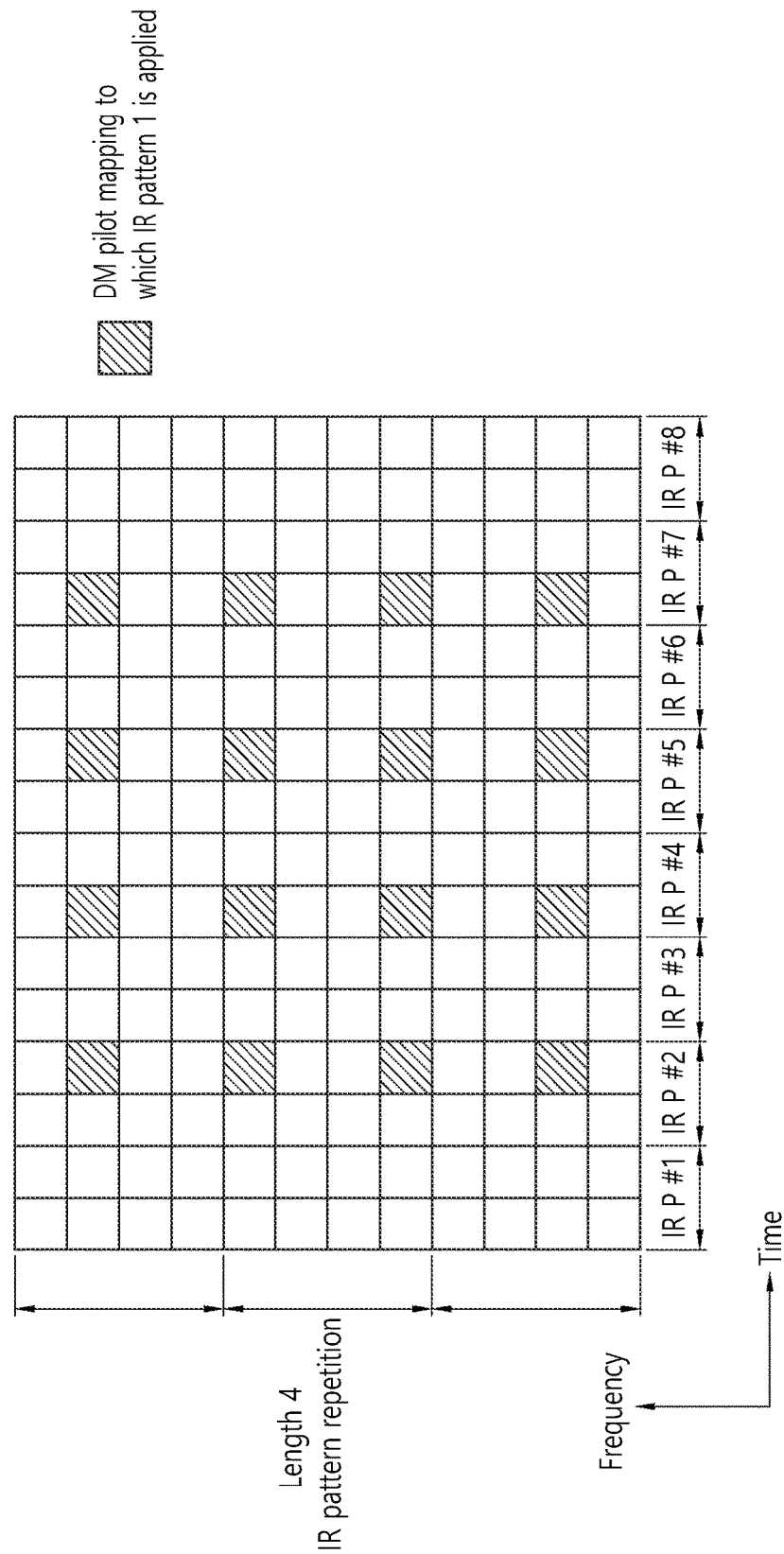
FIG. 10 is a diagram illustrating the IR pattern using the pilot signal according to an embodiment of the present invention.

FIG. 10 is a diagram illustrating the IR pattern using the pilot signal according to an embodiment of the present invention.

FIG. 10 shows an example of a case that the IR pattern modification frequency is greater than the demodulation pilot signal transmission frequency, and the IR pattern length is less than or equal to the number of frequency domain resources used for the demodulation pilot signal. The resource allocation structure shown in FIG. 10 may be applied to a case that the number of demodulation pilot signal transmissions and the resources to be used should be enough to indicate the modification of the IR pattern.

According to FIG. 10, IR patterns 1 to 8 are allocated sequentially according to the time domain and the IR pattern length is 4 and the IR pattern is repeated as a frequency domain. In FIG. 10, the IR pattern is changed by every 2 resource elements on the axis of the time domain and the demodulation pilot signal is transmitted with a representative pilot signal to which IR pattern 1 is applied. It shows that the IR pattern modification frequency is bigger than the demodulation pilot signal transmission.

As illustrated, according to an embodiment of the present invention, a representative value for one of the indexes relevant to the IR pattern in the resource block or the resource block subgroup may be delivered through the demodulation pilot signal. The IR pattern representative value may be the first IR pattern in the resource block or the resource block subgroup.

The IR pattern for the representative value is signaled, and then a wireless device may derive a successive IR pattern by the rule pre-set between the wireless device and the base station.

Figure 11:
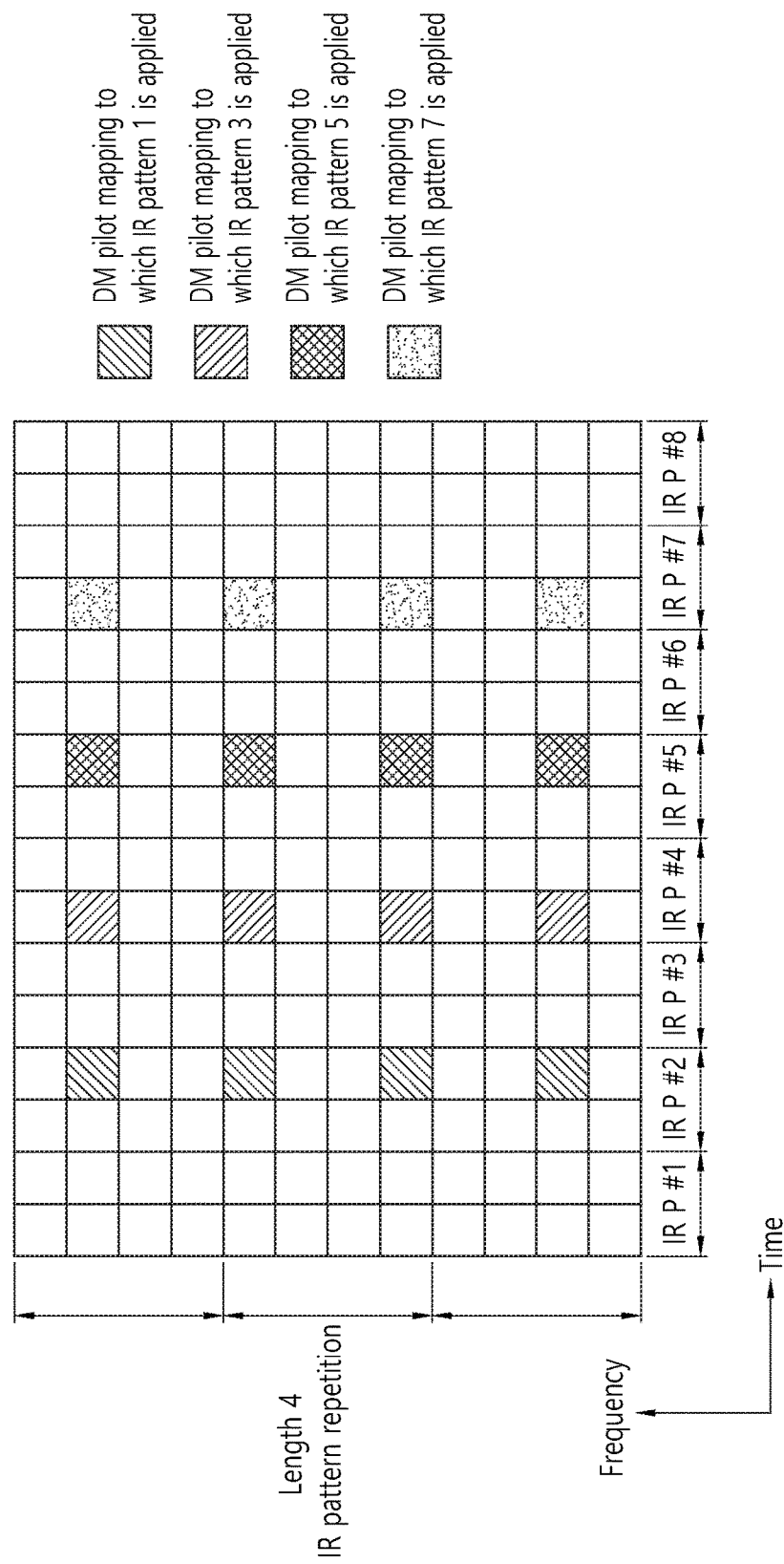
FIG. 11 is a diagram illustrating the IR pattern using the pilot signal according to an embodiment of the present invention.

FIG. 11 is a diagram illustrating the IR pattern using the pilot signal according to an embodiment of the present invention.

FIG. 11, as shown in FIG. 10, is illustrating an example of a case that the IR pattern modification frequency is greater than the demodulation pilot signal transmission frequency, and the IR pattern length is less than or equal to the number of frequency domain resources used for the demodulation pilot signal.

According to FIG. 11, IR patterns 1 to 8 are allocated sequentially according to the time domain and the IR pattern length is 4 and the IR pattern is repeated as a frequency domain. In FIG. 11, the IR pattern is changed by every 2 resource elements on the axis of the time domain and the demodulation pilot signal is transmitted by every 3 resource elements on the axis of the time domain. That is, the IR pattern modification frequency is bigger than the demodulation pilot signal transmission frequency.

Meanwhile, 4 demodulation pilot signals that are applied not to the IR patterns 1 to 8 but to IR pattern 1, IR pattern 3, IR pattern 5, IR pattern 7 may be transmitted. The wireless device may analogize the IR pattern modification frequency through 4 demodulation pilot signals and be aware the recurring event of the symbol that is repeatedly transmitted to the IR pattern through the demodulation pilot signal sequence.

Meanwhile, the resource allocation shown in FIGS. 10 and 11 may be applied to an environment as shown in FIG. 8

Figure 12:
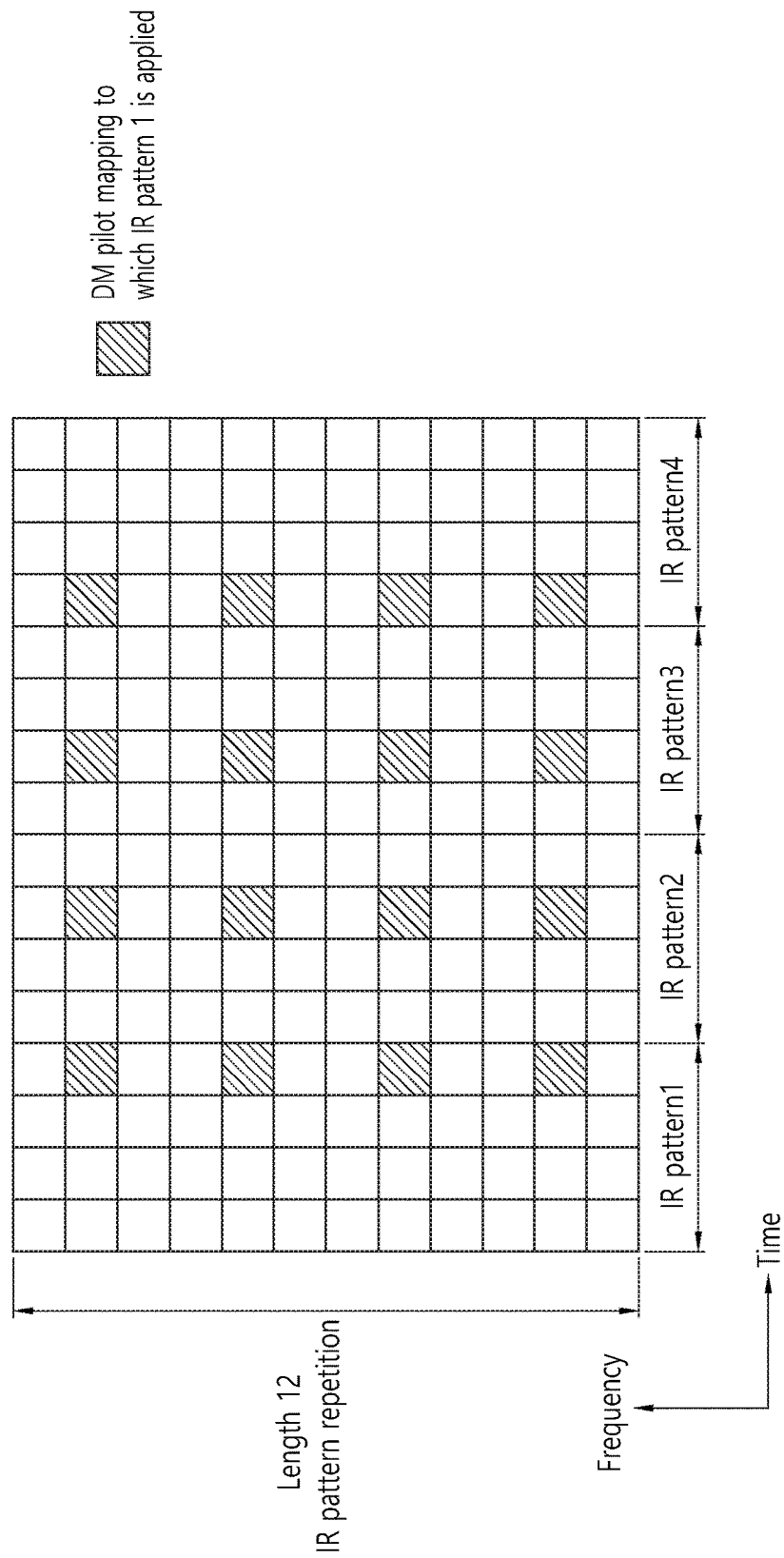
FIG. 12 is a diagram illustrating the IR pattern using the pilot signal according to an embodiment of the present invention.

FIG. 12 is a diagram illustrating the IR pattern using the pilot signal according to an embodiment of the present invention.

FIG. 12 shows an example of a case that the IR pattern modification frequency is less than or equal to the demodulation pilot signal transmission frequency, and the IR pattern length is greater than the number of frequency domain resources used for the demodulation pilot signal.

As illustrated, IR patterns 1 to 4 are allocated sequentially according to the time domain and the IR pattern is repeated as a frequency domain. In FIG. 12, the IR pattern is changed by every 4 resource elements on the axis of the time domain and the demodulation pilot signal is transmitted with a representative pilot signal to which IR pattern 1 is applied. It shows that the IR pattern modification frequency is bigger than the demodulation pilot signal transmission.

The IR pattern length is 12, and the number of frequency domain resources that are used for the demodulation pilot signal is 4.

As described above, through the present invention, the IR pattern randomization may be implemented by allocating different IR patterns to time domains and the IR pattern may be signaled by changing the sequence order periodically without any modifications in the length of the existing cell-specific pilot sequence or the value itself.

Figure 13:
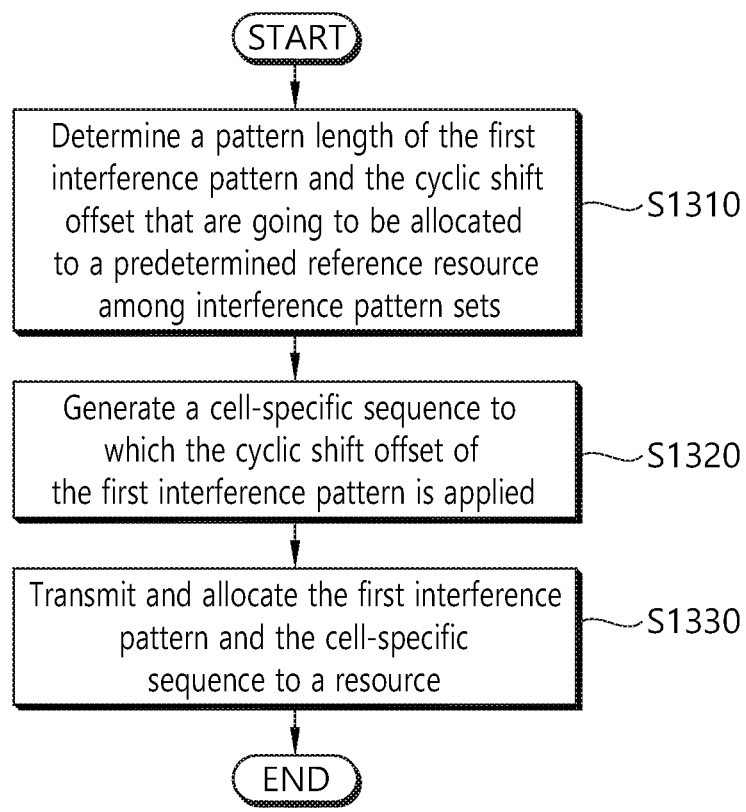
FIG. 13 is a control flow chart illustrating a method for signaling the interference pattern for the inter-cell interference control according to an embodiment of the present invention.

FIG. 13 is a control flow chart illustrating a method for signaling the interference pattern for the inter-cell interference control according to an embodiment of the present invention.

First of all, the base station may determine a pattern length of the first interference pattern and the cyclic shift offset that are going to be allocated to a predetermined reference resource among interference pattern sets (step, S1310).

The reference resource may be a resource that is a standard in the resource block or the resource group and may be the first time resource. The base station may allocate the interference pattern set from the reference resource and may determine the parameter value of the IR pattern for the first interference pattern that is allocated to the reference resource.

The interference pattern set may include a plurality of interference patterns according to a predetermined order such as FIG. 7a and FIG. 7b and it may be repeated in the time domain of the resource.

Two parameter values for the IR pattern size and the cyclic shift offset may be determined and the parameter value may be determined as a unique value of a cell or determined by consultation with neighboring cells.

From the IR pattern that is applied to such a reference resource may be derived the IR pattern that is applied to another resource block or resource group. The IR pattern selection method that is going to be used for another resource block or resource group may be configured through a predetermined regulation such as a standard and may be delivered to a wireless device through the system information, etc., in advance.

The base station may generate a cell-specific sequence to which the above cyclic shift offset of the first interference pattern is applied in order to signal the first interference pattern in which a parameter is determined (step, S1320).

The cell-specific sequence may change the sequence by applying the offset that is applied to the first interference pattern to the symbol that is repeatedly circulated without any modifications in the value and length of the existing demodulation pilot cell-specific sequence.

And then, the base station may transmit and allocate the first interference pattern and the cell-specific sequence to a resource (step, S1330).

For the inter-cell interference randomization, an interference pattern different in the pattern length and the cyclic shift offset from above may be allocated in the same resource of neighboring cells.

The cell-specific sequence may be generated variously based on the modification frequency of the interference pattern, the transmission frequency of the cell-specific sequence, the length of the interference pattern, and the number of frequency resources that are used for transmitting the cell-specific sequence. It may be implemented as an example referring to FIGS. 8 to 12.

Figure 14:
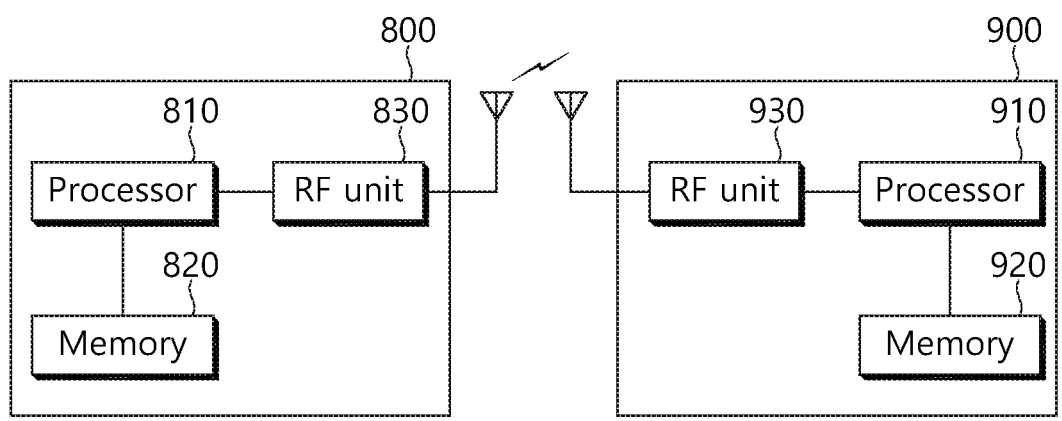
FIG. 14 is a block diagram illustrating a wireless communication system according to the present invention.

FIG. 14 is a block diagram illustrating a wireless communication system according to the present invention.

The base station 800 includes a processor 810, a memory 820, and an RF (radio frequency) unit 830. The processor 810 implements functions, processes, and/or methods as suggested herein. The layers of a wireless interface protocol may be implemented by the processor 810. The memory 820 is connected with the processor 810 and stores various pieces of information for driving the processor 810. The RF unit 830 is connected with the processor 810 and transmits and/or receives radio signals.

The wireless device 900 includes a processor 910, a memory 920, and an RF unit 930. The processor 910 implements functions, processes, and/or methods as suggested herein. The layers of a wireless interface protocol may be implemented by the processor 910. The memory 920 is connected with the processor 910 and stores various pieces of information for driving the processor 910. The RF unit 930 is connected with the processor 910 and transmits and/or receives radio signals.

The processor may include an application-specific integrated circuit (ASIC), a separate chipset, a logic circuit, and/or a data processing unit. The memory may include a read-only memory (ROM), a random access memory (RAM), a flash memory, a memory card, storage medium, and/or other equivalent storage devices. The RF unit may include a base-band circuit for processing a radio signal. When the embodiment of the present invention is implemented in software, the aforementioned methods can be implemented with a module (i.e., process, function, etc.) for performing the aforementioned functions. The module may be stored in the memory and may be performed by the processor. The memory may be located inside or outside the processor, and may be coupled to the processor by using various well-known means.

As such, when a wireless access is available through different wireless networks, the present invention provides a method and apparatus for a wireless device to select a wireless node for uplink according to a predetermined condition.

In the above-described systems, the methods are described with the flowcharts having a series of steps or blocks, but the present invention is not limited to the steps or order. Some steps may be performed simultaneously or in a different order from other steps. It will be understood by one of ordinary skill that the steps in the flowcharts do not exclude each other, and other steps may be included in the flowcharts or some of the steps in the flowcharts may be deleted without affecting the scope of the invention.

What is claimed is:

1. A method of transmitting, by a base station supported by a reference cell, a demodulation pilot signal for controlling inter-cell interference, the method comprising:
   determining a pattern length of a first interference pattern and a cyclic shift offset,
   wherein the first interference pattern is included in an interference pattern set and is allocated to a first time resource of a predetermined reference resource, and
   wherein the cyclic shift offset is used for distinguishing each interference pattern in the interference pattern set;
   generating a cell-specific sequence related with a demodulation pilot signal in which a cyclic shift offset for the first interference pattern is applied,
   wherein a pattern of the demodulation pilot signal is determined based on the pattern length of the first interference pattern and a number of frequency domain resources that are used for the demodulation pilot signal;
   transmitting the demodulation pilot signal based on the cell-specific sequence through a resource allocated according to the pattern of the demodulation pilot signal,
   wherein the demodulation pilot signal is used for signaling the first interference pattern.

2. The method of claim 1, wherein a different interference pattern is allocated to the predetermined reference resource for a neighboring cell.

3. The method of claim 1,
   wherein a second interference pattern included in the interference pattern set is induced from the first interference pattern, and
   wherein the second interference pattern are allocated in a second time resource which is continuous from the first time resource.

4. The method of claim 1, wherein the interference pattern set includes a plurality of interference patterns based on a predetermined order, and
   wherein the interference pattern set is repeated in a time domain of the predetermined reference resource.

5. The method of claim 1, wherein the cell-specific sequence is generated based on a modification frequency of the first interference pattern and a transmission frequency of the cell-specific sequence.

6. An apparatus of transmitting a demodulation pilot signal for controlling inter-cell interference, the apparatus comprising:

a transceiver that transmits and receives a signal; and a processor connected to the transceiver, wherein the processor is configured to:

determine a pattern length of a first interference pattern and a cyclic shift offset, wherein the first interference pattern is included in an interference pattern set and is allocated to a first time resource of a predetermined reference resource, and wherein the cyclic shift offset is used for distinguishing each interference pattern in the interference pattern set;

generate a cell-specific sequence related with a demodulation pilot signal in which a cyclic shift offset for the first interference pattern is applied, wherein a pattern of the demodulation pilot signal is determined based on the pattern length of the first interference pattern and a number of frequency domain resources that are used for the demodulation pilot signal; and transmit the demodulation pilot signal based on the cell-specific sequence through a resource allocated according to the pattern of the demodulation pilot signal, wherein the demodulation pilot signal is used for signaling the first interference pattern.

* * * * *